United States Patent [19]

Nanos

[11] Patent Number: 5,404,088
[45] Date of Patent: Apr. 4, 1995

[54] CIRCUIT FOR INCREASING MOTOR OUTPUT TO COMPENSATE FOR INCREASED LOAD

[75] Inventor: Nicholas M. Nanos, Morton Grove, Ill.

[73] Assignee: General Binding Corporation, Northbrook, Ill.

[21] Appl. No.: 118,025

[22] Filed: Sep. 8, 1993

[51] Int. Cl.6 .................................................. H02P 3/18
[52] U.S. Cl. .................................... 318/751; 318/739; 318/747; 318/782; 318/795
[58] Field of Search ....................... 361/23, 30–31, 361/88, 91, 93; 318/727, 730–736, 739–740, 749–755, 767–768, 746–747, 756, 781–782, 786, 798, 799, 795, 805, 806, 816, 817, 434, 474, 484, 280, 287–290

[56] References Cited

U.S. PATENT DOCUMENTS

| | | |
|---|---|---|
| 3,757,202 | 9/1973 | Prouty et al. ................ 323/45 |
| 3,803,866 | 4/1974 | Barry . |
| 4,197,532 | 4/1980 | Lawson ................ 361/33 X |
| 4,495,456 | 1/1985 | Vercillo et al. ................ 318/755 |
| 5,038,091 | 8/1991 | Bashark ................ 318/727 |
| 5,038,566 | 8/1991 | Hara ................ 60/608 |
| 5,075,613 | 12/1991 | Fisher ................ 318/809 |
| 5,130,624 | 7/1992 | Bashark ................ 318/742 X |
| 5,159,255 | 10/1992 | Weber ................ 310/775 |
| 5,166,568 | 11/1992 | Nystuen et al. ................ 318/751 X |
| 5,237,256 | 8/1993 | Bashark ................ 318/75 X |
| 5,252,904 | 10/1993 | Nanos ................ 318/739 |

Primary Examiner—William M. Shoop, Jr.
Assistant Examiner—David Martin
Attorney, Agent, or Firm—Hill, Steadman & Simpson

[57] ABSTRACT

A circuit for boosting the power output of a motor in which a sensor stage, preferably a voltage divider, is coupled to comparator stage, preferably a reverse biased to a diode, which in turn is coupled to a power boost stage, preferably a relay and switched capacitance associated therewith, such that upon sensing of excess loading of the motor, the capacitance is switched across the output of the motor.

15 Claims, 2 Drawing Sheets

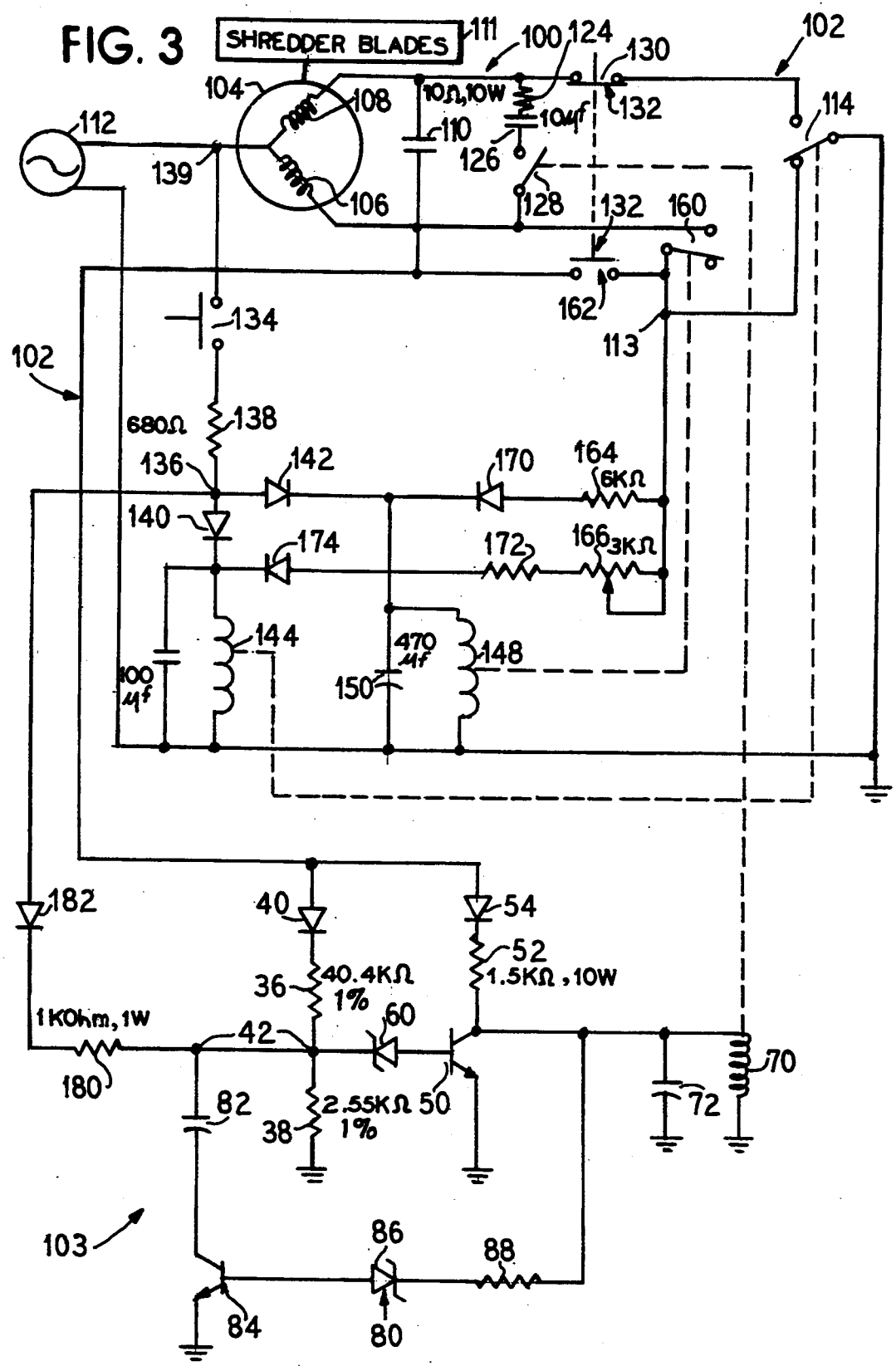

CIRCUIT FOR INCREASING MOTOR OUTPUT TO COMPENSATE FOR INCREASED LOAD

BACKGROUND OF THE INVENTION

The present invention generally relates to methods and means for controlling motors. More specifically, the invention relates to methods and means for controlling operation of permanent split capacitor motors.

Shredders are devices, as the nomenclature implies, that are used to shred items, for example, by slicing. To that end, shredders that slice include a plurality of blades driven by a motor, usually a permanent split capacitor motor. Typically they are used to shred paper-based products, but in some installations they are also used to shred a diversity of items, such as garbage.

Paper shredders are often used to shred sensitive documents so that the documents cannot be easily reassembled and thus the matter therein recognized or read. Typically, when more sheets of paper are fed into the shredder than the shredder can slice at one time, the shredder will jam. In my commonly assigned allowed U.S. patent application, Ser. No. 07/970,070, which issued Oct. 12, 1993 as U.S. Pat. No. 5,252,904, provides an arrangement wherein the slicing blade motor is automatically reversed to eject the paper, thereby relieving the jamming. There are other arrangements wherein the motor can be coupled to the blades by a slip clutch or the like and be permitted to slip.

It can be appreciated that it is advantageous to increase the capacity of a shredder so that the throughput, including the number of items of papers that can be shredded at one time, can be increased. Typically, the throughput is increased by increasing the size of the motor used to run the blades that affect the shredding. However, simply increasing the size of the motor is not always a practical option inasmuch as there may be space limitations and/or cost limitations involved.

SUMMARY OF THE INVENTION

The present invention provides a circuit for, at least temporarily, increasing the output of a motor as a loading thereof increases so that the motor can continue working, at least for a short duration. Advantageously, the circuit is employed in a shredder so that as more than a typical load is placed on the shredder motor, the motor can, at least temporarily, accommodate the excessive load.

In an embodiment, the invention provides a circuit for boosting power supplied to a motor, comprising:
a sensing stage configured to sense loading on the motor;
a comparator stage coupled to the sensing stage and configured to detect loading on the motor in excess of a preselected threshold; and
a power boost stage coupled to the comparator stage and configured to at least temporarily increase current through the motor in response to detection of excessive loading of the motor by the comparator stage so as to increase power output of the motor.

In an embodiment of the invention, the motor is a permanent split capacitor motor having run and auxiliary windings and a capacitor coupled across the windings, and the sensor stage is coupled to sense voltages at a circuit node between the capacitor and the auxiliary winding.

In an embodiment of the invention, the sensor stage is a voltage divider.

In an embodiment of the invention, the comparator stage is a Zener diode, and the Zener diode is reverse biased coupled to the voltage divider.

In an embodiment of the invention, the power boost stage is a switched capacitance coupled across the windings and a relay associated therewith to selectively temporarily switch the capacitance across the windings whenever the loading on the motor becomes excessive.

In an embodiment, the invention provides a circuit for boosting the power output of a permanent split capacitor motor having run and auxiliary windings and a capacitor coupled across the windings, comprising:
a sensing stage coupled to a circuit node between the capacitor and the auxiliary winding;
a voltage comparison stage coupled to the sensing stage;
a switch activator stage coupled to the voltage comparison stage;
a switched capacitor, comprising a series coupled controllable switch and capacitor, which is coupled across the windings and the switch of which is coupled to the switch activator stage.

In an embodiment, the invention provides a shredder with a set of blades, a motor coupled to drive the blades, and a circuit configured to control the shredder, the circuit including a subcircuit for at least temporarily increasing the power output of the motor upon excessive loading of the motor.

These and other features of the invention will become clear with reference to the following detailed description of the presently preferred embodiments and accompanying drawings.

BRIEF DESCRIPTION OF THE DRAWINGS

FIG. 3 illustrates a schematic diagram of a circuit for controlling the operation of the shredder of FIG. 2 incorporating the circuit of FIG. 1.

DETAILED DESCRIPTION OF THE PRESENTLY PREFERRED EMBODIMENTS

As described above, the present invention provides the circuit for increasing the power output of a motor, as the load on the motor exceeds a preselected threshold, thereby providing a compensation for the excessive loading. Specifically, the circuit can be configured to increase the power output of a permanent split capacitor motor when the load on the motor exceeds the threshold.

Figure 1:
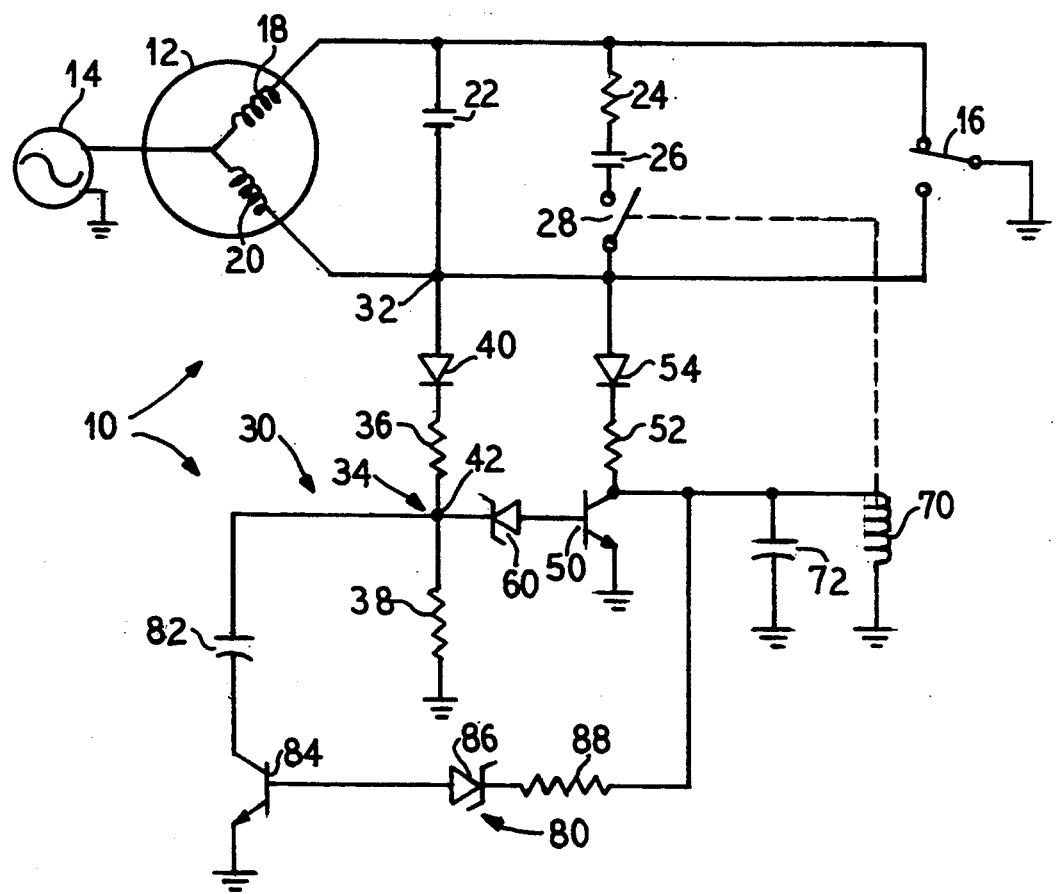
FIG. 1 illustrates a schematic diagram of a circuit for increasing the power output of a permanent split capacitor motor when the load exceeds a preselected amount.

In FIG. 1, there is an exemplary embodiment of the invention in the form of a circuit 10. In FIG. 1, there is illustrated a reversing permanent slip capacitor (PSC) motor 12 which is appropriately coupled between a suitable alternating current (AC) power supply 14 (e.g., 115 VAC) and a reversing switch 16. As is known, in a permanent split capacitor motor, such as the motor 12, two windings 18 and 20 are provided and configured such that one is the run/forward winding and the other is the auxiliary/reverse winding, depending on the direction in which the motor is run. In FIG. 1, the motor 12 is illustrated in its forward mode or state, i.e., winding 18 is employed as the run or forward winding and winding 20 is the auxiliary or reverse winding. Accordingly, for the motor 12 to be run in its reverse direction, the switch 16 must be switched so as to connect the winding 20 between the power supply 14 and electrical ground.

A capacitor 22 is coupled across both windings 18 and 20. As is known, a capacitor such as the capacitor 22 determines the amount of phase shift between the current and voltage phases in the power drawn by the motor 12.

Also coupled across the windings 18 and 20 is a series circuit comprising a 10 ohm, 10 watt resistor 24 and a 10 μF capacitor 26 and a relay activated switch 28. In a manner that will be further described hereinbelow, the switch 28 is selectively closed or thrown so as to couple the resistor 24 and capacitor 26 across the windings 18 and 20 to further increase the capacitance thereacross. By increasing the capacitance across the windings 18 and 20, the output of the motor 12 can be increased, at least temporarily, to accommodate or compensate for an excessive loading on the motor 12. In effect, the phase shift is altered to increase the amount of current drawn by the motor 12. Also, in effect, this arrangement provides a switched capacitance across the windings 18 and 20.

To accomplish the foregoing, there is provided a circuit 30 coupled to a circuit node 32 situated between the auxiliary winding 20 and the capacitor 22, which circuit 30 in effect measures the loading on the motor 12 and then causes the switch 28 to close when the loading exceeds a preselected threshold.

In the circuit 30 there is provided a voltage divider 34 comprising a 46.4K ohm, 1% resistor 36 and a 2.55K ohm, 1% resistor 38 coupled in series between the node 32 and electrical ground. A diode 40 is coupled between the voltage divider 34 and the node 32. As can be appreciated, the diode 40 allows only for flow of current in one direction, thereby providing a half-wave rectified signal to the voltage divider 34. The voltage divider 34 is configured such that the reduced amplitude voltage signal resulting at a node 42 between the resistors 34 and 36, is approximately 12 volts or greater, under normal loading conditions.

In essence, the voltage divider 34 acts as a sensing or sensor stage.

The circuit 30 further includes an NPN transistor 50 configured in open collector or common emitter mode by virtue of its emitter being coupled to ground and its collector being coupled to a power source, namely node 32, albeit via a 1.5K ohm, 10 watt current limiting resistor 52 and a diode 54 coupled in series. The diode 54 is disposed to provide a half-wave rectified signal to the collector of the transistor 50, which signal has the same polarity as that supplied to the voltage divider 34.

As also illustrated, the base of the transistor 50 is coupled to the circuit node 42 of the voltage divider 34 via a Zener diode 60. The Zener diode 60 has a known breakdown or breakover voltage, preferably of about 12 volts. It can be appreciated that as long as the voltage of the signal generated by the voltage divider 34 at the circuit note 42 exceeds the breakover voltage of 12 volts of the Zener diode 60, the transistor 50 will be turned on and in an "on" state. Otherwise, the transistor 50 will be placed in an "off" state.

In essence, the Zener diode 60 acts as a comparator stage.

Also coupled between the collector of the transistor 50 and electrical ground are a relay 70 and a 100 μF storage capacitor 72. It can be appreciated that while the transistor 50 is turned on, the storage capacitor 72 is drained and the relay 70 is deenergized inasmuch as the transistor 50 will direct current from its collector to electrical ground. However, should the transistor 50 be turned off, the storage capacitor 72 will quickly change and the coil of the relay 70 will be energized.

As illustrated, the switch 28 is associated with the relay 70 and is activated by same. Therefore, the switch 28 will be caused to open and close, depending on the energization of the relay 70. When the relay is energized, the switch 28 will be caused to closed thereby placing the resistor 24 and capacitor 26 across the windings 18 and 20. When the relay is de-energized, the resistor 24 and capacitor 66 are decoupled from across the windings 18 and 20.

As can be appreciated, as loading on the motor 12 increases, the voltage present at circuit node 32 between the reverse winding 20 and the PSC capacitor 22 decreases. In turn, the voltage signal generated at circuit node 42 by the voltage divider 34 decreases. When the voltages at node 32 and 42 decrease sufficiently, i.e., enough to cause the voltage of the signal at node 42 to fall below the breakover voltage of the Zener diode 60, the transistor 50 will turn off and the relay 70 will be permitted to rapidly energize thereby causing the switch 28 to quickly close. Once the loading is eased, the converse will occur.

To prevent chatter or excessive oscillation between turn on and turn off of the transistor 50, i.e., to provide sufficient hysteresis, in the above described arrangement, in the illustrated configuration there is coupled across the collector of the transistor 50 and the circuit node 42 of the voltage divider 34, a circuit 80 comprising a 1.0 μF capacitor 82, an NPN transistor 84, a Zener diode 86, and a 5.6K ohm resistor 88. The capacitor 82 is coupled between the node 42 of the voltage divider network 34 and the collector of the transistor 84. The emitter of transistor 84 is coupled to ground. Coupled between the base of the transistor 84 and the collector of the transistor 50 (and the capacitor 72) is the Zener diode 86 and the resistor 88.

As long as the transistor 84 is off, the capacitor 82 will remain charged to the potential or voltage level of the signal at node 42. However, it can be appreciated that when a voltage at the collector of the transistor 50 (i.e., of the storage capacitor 72) exceeds the breakover voltage of the Zener diode 86 (i.e., upon occurrence of an excessive loading), the transistor 84 is turned on. When the transistor 84 is turned on, the capacitor 82 is allowed to discharge to ground over a calculated time constant. The trick is to select the value of the capacitor 72 to be such that it discharges more slowly than the capacitor 82 so that capacitor 82 can fully discharge before capacitor 72 does. This will allow the switch 28 to remain closed for a determinable short time period and then prevent closure of the switch 28 for another determinable short time period. As a result, the circuit 80 introduces some hysteresis into the circuit 10.

It can be appreciated that due to the foregoing configuration, the circuit 10 of FIG. 1 automatically steps up the power output of the permanent split capacitor motor 12 when additional power is needed. This is done by constantly sensing the voltage at the node 34 and comparing a voltage related thereto to the breakover voltage of the Zener diode 60. As the load increases, the voltage at node 32 decreases. When the voltage at node 32 falls below the reference voltage of the Zener diode 60, the output of the transistor 50 switches to a high impedance, allowing the relay 70 to quickly energize and cause switch 28 to close. As a result, the capacitor 26 is placed across the windings 18 and 20 thereby increasing the power output of the motor 12. However, such increase in the output of the motor should only be made temporary as the motor will overheat and the power transferred thereto will become inefficient.

With the exception of the Zener diodes 60 and 86, the diodes preferably are of the type generally designated IN4006. The Zener diodes 60 and 86 preferably are of the type generally designated IN4742. The relay 70 preferably is of the type designated JTIE-DC24V sold by Aromat. The transistors 50 and 84 preferably are of the type generally designated TIP122.

Figure 2:
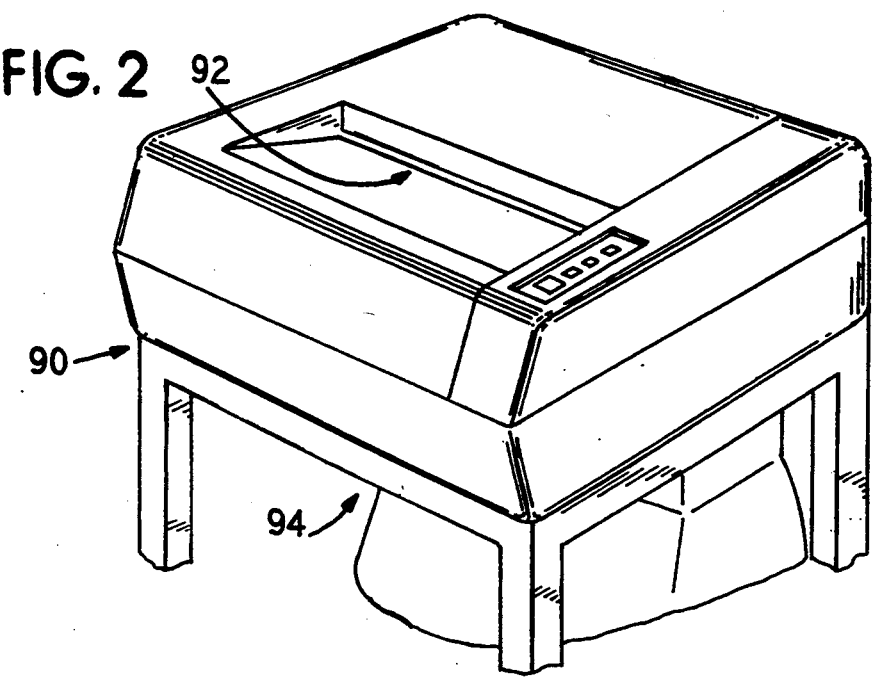
FIG. 2 illustrates a shredder in which the circuit of FIG. 1 can be implemented.

In FIG. 2, there is illustrated a paper shredder 90, in this instance, Model 1036/1246 manufactured by the assignee of this invention, the General Binding Corporation. Such a shredder includes an input tray 92 into which papers are fed for shredding. The shredded papers fall from beneath an underside 94 of the shredder 90 where they are collected for disposal.

In FIG. 3, there is illustrated a circuit 100 for implementation of the invention in a shredder such as the shredder 90 of FIG. 2. In that regard, there is illustrated in FIG. 3 a circuit 100 including a basic circuit 102 for operation of the PSC motor 104 of a 1036/1246 shredder as adapted to incorporate therein a circuit 103 embodying the principles of the invention. The basic circuit 102 provides for operation of the motor 104 and shredder in three modes, namely, ON, AUTO-REVERSE and OFF/REVERSE.

This basic circuit 102 is the subject of allowed and commonly assigned application Ser. No. 07/970,070 filed Nov. 2, 1992, and fully incorporated herein by reference.

Like the motor of FIG. 1, the PSC motor 104 of FIG. 3 includes run and auxiliary windings 106 and 108, respectively, and a capacitor 110 coupled thereacross. The windings 106 and 108 are commonly connected to a suitable AC power source 112, preferably a 115 volt AC source. The motor 104 is suitable coupled to a set of shredder blades 111.

In the ON mode, the motor runs in its forward direction to drive the set of blades 111 coupled thereto for shredding action. In the AUTO-REVERSE mode, the motor will automatically reverse when the blades are jammed, thereby to release the material causing the jam. In the REVERSE mode, an operator manually directs the motor 104 and blades 111 to operate in the reverse direction to release any material in the blades 111.

The windings 106 and 108 are coupled to a relay actuated reversing switch 114 that selectively couples the run winding 106 or the reverse winding 108 to ground, depending on the direction in which the motor 104 is to be run.

There is also included a series circuit comprising a 10 ohm, 10 watt resistor 124, a 10 $\mu$F capacitor 126 and relay activated switch 128 similar to the resistor 24, capacitor 26 and switch 28 of the embodiment of FIG. 1. And, there is disposed between the reversing switch 114 and the winding 108 a normally closed contact 130 of a control switch 132, the interaction of which with the remainder of the circuit 100 is described below. This switch 132 is used to place the circuit 100 in the OFF-/REVERSE mode.

Another switch 134 has one end coupled to a circuit node 136 located between the power supply 112 and the windings 106 and 108 and another end coupled to another portion of the basic circuit 102 via a 680 ohm current limiting resistor 138. The resistor 138 carries current transmitted through the switch 136 to a pair of branching diodes 140 and 142, the diode 140 being further connected and biased to direct half wave rectified current to a coil 144 and 100 $\mu$F storage capacitor 146 of a first relay and the diode 142 being further connected and biased to direct half wave rectified current to a coil 148 and a 470 $\mu$F storage capacitor 150 of a second relay.

The first relay is constructed to selectively actuate the reversing switch 114. The second relay is constructed to actuate another switch 160 disposed to selectively connect the winding 108 to the switch 114.

It can be appreciated that when the switch 134 is closed, the capacitor 146 will rapidly charge. When the capacitor 146 is sufficiently charged, the coil 144 of the first relay will be energized and the switch 114 will be actuated to connect winding 108 to ground thereby causing the motor 104 to run in its forward direction. This places the shredder in its ON mode, with the shredder blade 111 rotating for shredding action.

At the same time that the capacitor 146 is so charged and the coil 144 of the first relay is so energized and the switch 114 is so actuated, the capacitor 150 is similarly charged, the coil 148 of the second relay is similarly energized and the switch 160 is similarly actuated. Essentially, the winding 106 is coupled to the basic circuit 102. In that regard, the coil 106 is coupled to one side of a normally open contact 162 associated with switch 132 and two branching resistors, 6K ohm resistor 164 and 3K ohm variable resistor 166. The other side of the normally open contact 162 of the switch 132 is coupled to the circuit 103 via circuit node 128, which circuit node 128 is located between winding 106 and capacitor 110 and which provides the node at which motor loading is sensed.

The first branching resistor 164 is further coupled to a diode 170 biased and coupled to direct half wave rectified current to the capacitor 150 and coil 148 of the second relay. The second branching variable resistor 166 is further coupled to a 5K ohm resistor 172 and a diode 174 biased and coupled to direct half wave rectified current to the capacitor 146 and coil 144 of the first relay.

The circuit 103 in relevant part is identical to the circuit 30 of FIG. 1 and thus a description thereof is not further provided herein except where necessary. Like reference numerals have been provided in FIG. 3 for the like circuit components of FIG. 1.

In addition to the foregoing, however, there is provided a 1K ohm, 1 watt resistor 180 and diode 182 coupled between node 42 of the circuit 103 and node 136 of circuit 102. As set forth above, 139 is selectively coupled to node 136 via resistor 138 and normally open switch 134. The resistor 180 and diode 182 serves to provide half wave rectified current to the capacitor 82 when the motor 104 is first caused to be turned on by closure of the switch 134 so that the Zener diode 60 and transistor 50 initially recognize a load on the motor 104 within the acceptable range. It can be appreciated that once the switch 134 is released, the resistor 180 and diode 182 are decoupled from the circuit node 136 so that the circuit 103 operates in the manner set forth above for the circuit 30 of FIG. 1.

The relays 144 and 148, like the relay 70, preferably are of the type JTIE-DC24V sold by Aromat. The diodes 140, 142, 170 and 174, like the non-Zener diodes 40 and 54, preferably are of the type generally designated as IN4006.

In operation, the motor is turned on by momentary closing of the switch 134. This supplies current to the coils 144 and 148 of the first and second relays, respectively, as set forth above. This, in turn, causes the first relay to move the switch 114 to the normally open position, which couples the winding 108 between the AC power supply 112 and ground and starts the motor 104 rotating in the forward direction. At the same time, the second relay causes the switch 160 to connect the winding 106 to the branching resistors 164 and 166. Just enough current is transmitted through the two branching resistors 164 and 166 to keep the first and second relays energized. The variable resistor 166 sets a load threshold on the shredder motor 104 at which a reversing operation is triggered.

It can be appreciated that the reversing threshold is set to be higher than the threshold at which circuit 103 triggers application of the capacitor 126 across the windings 106 and 108. Thus, the shredder will first attempt to increase the power to the motor 104, and if the load is not too excessive (e.g., not more than a few pages above design), the motor 104 will continue to operate in forward setting. Otherwise, if the load is too excessive, e.g, a few pages above design, then the motor 104 will be caused to reverse in the manner established by the circuit 102.

To that end, when the load level or threshold set by the variable resistor 166 is exceeded, the circuit 102 senses the excessive load and automatically reverses the motor 104 to remove the load. In particular, any load on the motor causes a reduction in the voltage at the circuit node 113. The voltage drop causes a corresponding drop in the current through the relay windings 144 which holds the switch 114 closed. An excessively heavy load or a stalling of the motor 104 drops the voltage enough to release the relay contact 114 so that it returns to the normally open position, as shown in FIG. 3. The opening of the switch 114 connects the winding 106 to ground through switch 160, which has not opened. When the winding 106 is so connected, winding 108 is effectively phase shifted relative to the winding 106 and the motor 104 is, thus, caused to run in the reverse direction.

Reverse operation of the motor 104 continues so long as the capacitor 150 remains charged at a voltage sufficient to supply holding current to the second relay winding 148. The capacitor 150 discharges sufficiently in, preferably, one to two seconds to permit the switch 160 to open. Opening of the switch 160 then turns the motor 104 off.

The motor 104 also may be turned off during normal, or forward, operation when desired by manual momentary operation of the switch 132. By temporarily actuating the switch 132 and then releasing the switch 132, the normally closed contacts 130 open to break the current path between the winding 108 and ground. At that time, the capacitor 146 discharges and the switch 114 opens and the motor 104 stops.

The motor 104 also may be manually caused to operate in its reverse direction. To that end, if the switch 132 is held in the operated position, the normally closed contact 130 will open thereby beating the current path through the run winding 108. At the same time, the normally open contact 162 closes to provide a current path to couple the auxiliary winding 106 to ground through closed switch 160 and this causes the motor 104 to operate in the reverse direction for so long as the switch 132 is held in the operated position. Releasing the switch 132 then stops the motor 104. It is thus possible to manually clear a jam by holding the switch 132 in the operated position until the jam is clear.

Although modifications and changes may be suggested by those skilled in the art, it is the intention of the inventor to embody within the patent warranted hereon all changes and modifications as reasonably and properly come within the scope of the contribution to the art.

I claim:

1. A circuit for boosting power output of a permanent Split capacitor motor having run and auxiliary windings and a capacitor coupled across the windings, comprising:
   a sensor stage configured to sense loading on the motor, the sensor stage being coupled to sense voltages at a circuit node between the capacitor and the auxiliary winding;
   a comparator stage coupled to the sensor stage and configured to detect loading on the motor in excess of a preselected threshold; and
   a power boost stage coupled to the comparator stage and configured to at least temporarily increase current through the motor in response to detection of excessive loading of the motor by the comparator stage so as to increase power output of the motor, the power boost stage comprising a switchable capacitance coupled across the windings and a relay operatively associated therewith to selectively temporarily switch the capacitance across the windings whenever the loading on the motor becomes excessive.

2. The circuit of claim 1, wherein the sensor stage comprises a voltage divider.

3. The circuit of claim 2, wherein the comparator stage comprises a Zener diode that is coupled to the voltage divider such that the Zener diode is reverse biased with respect to the voltage divider.

4. The circuit of claim 1, wherein the comparator stage comprises a Zener diode coupled in reverse biased relationship with respect to the sensor stage.

5. A circuit for boosting the power output of a permanent split capacitor motor having run and auxiliary windings and a capacitor coupled across the windings, comprising:
   a sensor stage coupled to a circuit node between the capacitor and the auxiliary winding;
   a voltage comparator stage coupled to the sensor stage;
   a switch actuator stage coupled to the voltage comparison stage;
   a switched capacitor, comprising a controllable switch and capacitor coupled in series, which are coupled across the windings, the controllable switch being coupled to the switch activator stage.

6. The circuit of claim 5, wherein the sensor stage comprises a voltage divider.

7. The circuit of claim 5, wherein the voltage comparator stage comprises a Zener diode.

8. The circuit of claim 5, wherein the switch actuator stage comprises a relay.

9. The circuit of claim 5, wherein the switch actuator stage comprises:

a storage capacitor coupled in parallel to a relay and an amplifier stage coupled to both the storage capacitor and the relay.

10. A shredder comprising a set of blades for shredding matter, a permanent split capacitor motor coupled to the set of blades and having a capacitor coupled across run and auxiliary windings, and a circuit configured to control operation of the shredder, the circuit comprising a first subcircuit for controlling operation of the motor and a second subcircuit for at least temporarily increasing power output of the motor upon excessive loading of the motor, the second subcircuit comprising:
 a sensor stage configured to sense loading on the motor;
 a comparator stage coupled to the sensor stage and configured to detect loading on the motor in excess of a preselected threshold; and
 a power boost stage coupled to the comparator Stage and configured to at least temporarily increase current through the motor in response to detection of excessive loading of the motor by the comparator stage so as to increase power output of the motor, the power boost stage comprising a switchable capacitance coupled across the windings and a relay operatively associated therewith to selectively temporarily switch the capacitance across the windings whenever the loading on the motor becomes excessive.

11. The shredder of claim 8, wherein the sensor stage comprises a voltage divider coupled to a circuit node between the auxiliary winding and the capacitor of the motor.

12. The shredder of claim 11, wherein the comparator stage comprises a Zener diode coupled to the voltage divider such that the Zener diode is reverse biased with respect to the voltage divider.

13. The shredder of claim 11, wherein the sensor stage comprises a Zener diode coupled in reverse bias relationship with respect to the sensor stage.

14. A method for increasing power output of a permanent split capacitor motor comprising the steps of:
 sensing a voltage present at a circuit node between an auxiliary winding and a capacitor of the motor;
 comparing the sensed voltage to a reference voltage; and
 increasing capacitance across the run and auxiliary windings of the motor when the sensed voltage exceeds the reference voltage by energizing a relay and switching a Capacitor associated therewith across the windings, the increase in capacitance providing a phase shift which increases an amount of current drawn by the permanent split capacitor motor.

15. The method of claim 14, wherein the comparison step comprises employing a reverse bias Zener diode to determine if the sensed voltage falls above or below the break over voltage of the Zener diode.

* * * * *